March 1, 1966     J. E. STANKEY ETAL     3,238,469
ELECTRONIC ASSEMBLY
Original Filed Sept. 29, 1958     9 Sheets-Sheet 1

JOHN E. STANKEY
THOMAS D. ECCLES
INVENTORS.

BY Smyth, Roston & Pavitt

ATTORNEYS.

March 1, 1966 J. E. STANKEY ETAL 3,238,469
ELECTRONIC ASSEMBLY
Original Filed Sept. 29, 1958 9 Sheets-Sheet 3

JOHN E. STANKEY
THOMAS D. ECCLES
INVENTORS

By Smyth, Roston & Pavitt
ATTORNEYS.

March 1, 1966 J. E. STANKEY ETAL 3,238,469
ELECTRONIC ASSEMBLY
Original Filed Sept. 29, 1958 9 Sheets-Sheet 6

JOHN E. STANKEY
THOMAS D. ECCLES
INVENTORS.
By Smyth, Roston & Pavitt
ATTORNEYS.

March 1, 1966  J. E. STANKEY ETAL  3,238,469
ELECTRONIC ASSEMBLY
Original Filed Sept. 29, 1958  9 Sheets-Sheet 7

JOHN E. STANKEY
THOMAS D. ECCLES
INVENTORS.

BY Smyth, Roston & Pavitt
ATTORNEYS.

JOHN E. STANKEY
THOMAS D. ECCLES
  INVENTORS.

By Smyth, Roston & Pavitt
  ATTORNEYS.

United States Patent Office 3,238,469
Patented Mar. 1, 1966

3,238,469
ELECTRONIC ASSEMBLY
John Edward Stankey, Altadena, and Thomas D. Eccles, West Covina, Calif., assignors to Microdot Inc., Pasadena, Calif., a corporation of California
Continuation of application Ser. No. 763,907, Sept. 29, 1958. This application Apr. 5, 1962, Ser. No. 186,822
13 Claims. (Cl. 330—56)

This invention relates to a generally cylindrical electronic assembly and more particularly to transmission line means for use in such an assembly, and is a continuation of copending application Serial No. 763,907, filed September 29, 1958, now abandoned, in the names of John E. Stankey and Thomas D. Eccles.

It is an object of this invention to provide an amplifier or oscillator employing a light house tube which is very compact, being only slightly larger in volume than the tube itself.

It is another object of this invention to provide an amplifier or oscillator as above, which can be readily tuned throughout a wide range of frequencies without altering the overall size of the amplifier or oscillator.

It is a further object of this invention to provide such an amplifier as can be easily sealed against contaminants.

It is another object of this invention to provide a transmission line means such as can be used to provide distributed inductance and capacitance in connection with an amplifier or oscillator.

It is another object of this invention to provide a transmission line means which can be made in flat circular form readily adapted for use with circularly symmetrical electronic components such as electronic tubes known as light house tubes.

It is another object of this invention to provide an improved transmission line means of the type employed to provide distributed inductance and capacitance as for example in filters and amplifiers.

It is the further object of this invention to provide such a transmission line means as is compact and small in overall bulk.

It is another object of this invention to provide such a transmission line means as can be elegantly adapted for use in cylindrical assemblies.

It is another object of this invention to provide such a transmission line means as can readily be combined with a coaxial transmission line, and providing simple and elegant means for feeding energy into and out of the combination with minimum electrical and physical discontinuity.

It is a further object of this invention to provide improved filter systems for high frequencies which are compact, inexpensive and which can be constructed in modular fashion from a series of individual sandwiches or layers of relatively few types.

In accordance with these and other objects which will become apparent hereinafter, preferred forms of the present invention will now be described with reference to the accompanying drawings wherein.

FIGS. 22 through 27 illustrate application of the arcuate transmission line of the present invention to various types of filters.

Figure 1:
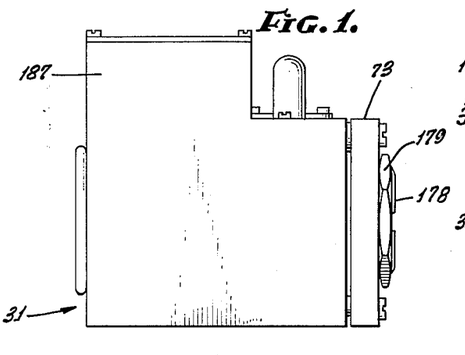
FIG. 1 is a side elevation of an amplifier embodying the present invention.
Figure 2:
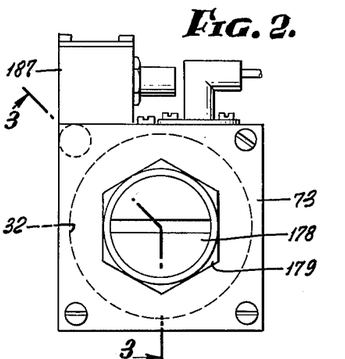
FIG. 2 is an end elevation of the amplifier.
Figure 3:
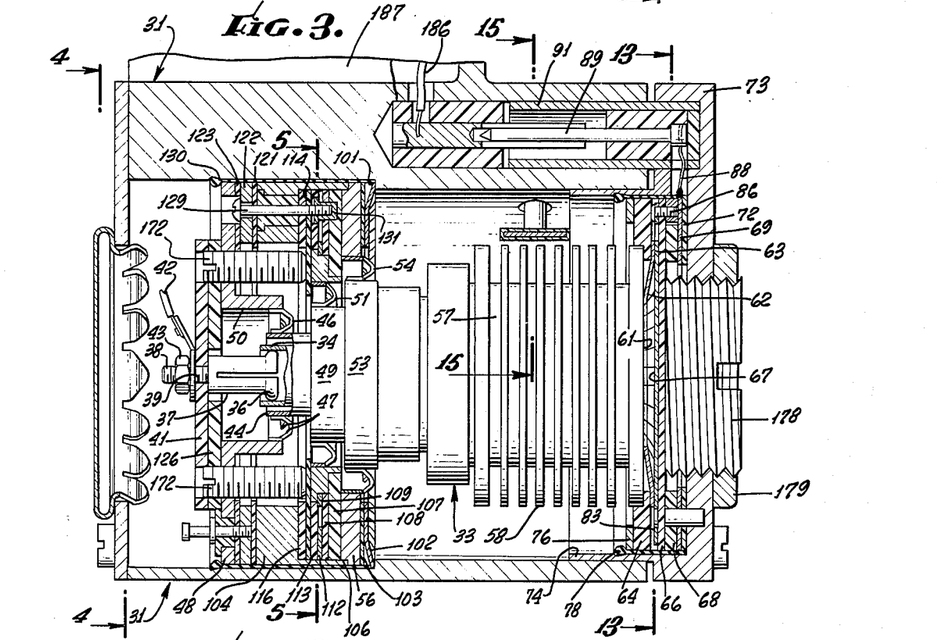
FIG. 3 is a cross-section taken on line 3—3 in FIG. 2.
Figure 15:
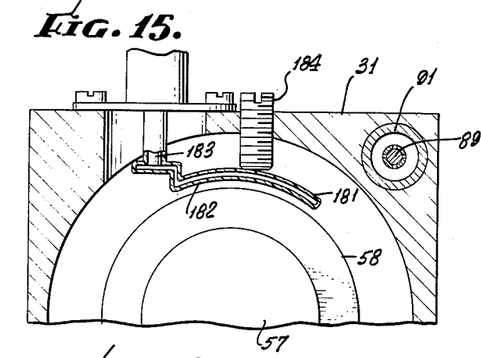
FIG. 15 is a fragmentary section taken on line 15—15 in FIG. 3.

Referring now to FIGS. 1, 2 and 3, there is illustrated an electronic assembly having a metal housing or shell 31 within which is formed a circular cylindrical cavity 32 (FIG. 15). Coaxially mounted within the cavity 32 is a generally cylindrically electronic component, consisting in this case of a lighthouse tube or electron valve 33. A coaxially disposed tubular terminal 34, connected within the tube or electron valve 30 to one side of the heater, embraces and electrically engages a circular boss 36 formed on the end of a slotted conductive tube 37. The tube 37 has a conductive threaded stud 38 secured thereto which passes through a bore 39 in an insulating mounting plate 41. An insulated conductor 42 secured to the stud 38 by a nut 43 leads to one side of a source of heating voltage.

Spaced radially outward of the tubular valve terminal 34 is another tubular terminal 44 which engages within a ring-like terminal 46 having a plurality of inwardly-extending spring fingers 47. The ring 46 is secured to a metal cylinder 50, which is in turn secured to, or preferably formed integral with, a circular metal plate 48. The terminal 44 connects within the tube to the other side of the heater and also to the cathode of the tube or valve.

Spaced still further radially outward and longitudinally of the tubular terminal 44 is another coaxially tubular terminal 49 which engages within resilient ring fingers 51 secured to and within a metal ring 52.

Spaced still further radially outward and longitudinally is another ring-like coaxial tube terminal 53 which engages within resilient ring fingers 54 bonded to a conducting plate or ring 56.

The ring 49 connects within the tube to the number one or control grid of the tube and ring 53 connects within the tube to the second or screen grid.

Figure 14:
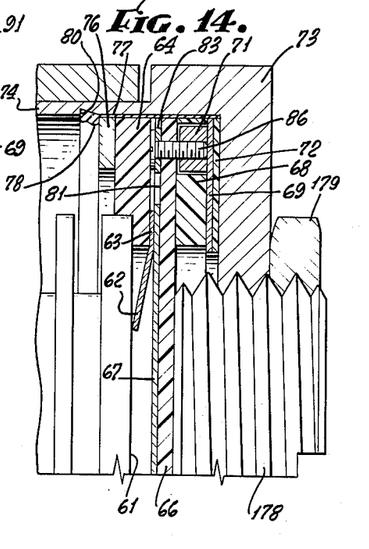
FIG. 14 is a fragmentary section taken on line 14—14 in FIG. 13.

The conductive body 57 of the tube is connected internally to the anode or plate and is finned as shown at 58 to assist in heat dissipation. The end wall 61 (FIG. 14) of the tube body is engaged by a series of resilient ring fingers 62 formed on the inner edge of a ring 63. The finger ring 63 is clamped between a dielectric ring 64 and a dielectric disc 66 carrying a metallic coating 67, shown in FIG. 14 in greatly exaggerated thickness.

Disposed contiguously outward of the disc 66 is a dielectric ring 68 and next to it a conductive ring 69 having a terminal boss 71 bonded thereto adjacent the edge thereof. Finally there is a dielectric ring 72 immediately adjacent the conductive end cap 73 which has a cylindrical flange 74 nesting within the end of the cavity 32 in the conductive body 31.

Inwardly of the assembly is a conductive ring or washer 76. The entire sandwich, i.e., all of the layers 76 to 72 are insulted cylindrically from the metal wall of the cap 73 by a cylindrical sleeve 77 and held firmly in position.

Figure 13:
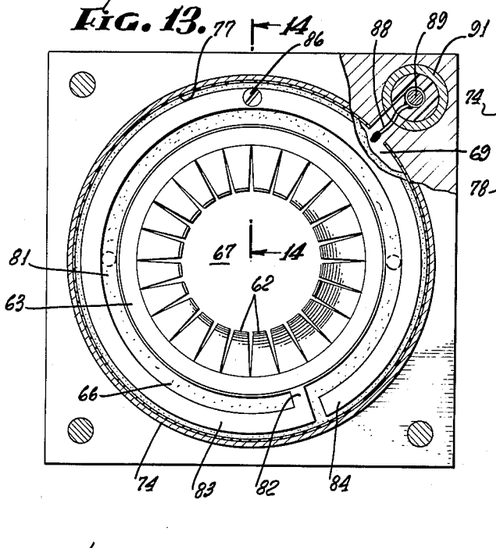
FIG. 13 is a cross-section taken on line 13—13 in FIG. 3.

The conductive coating 67 is printed or otherwise applied to the base (FIG. 13) in the form of an arcuate transmission line or conductor 83, one terminal of which constitutes the circular center portion of the coating 67, in contact with finger ring 63. The transmission line proceeds radially outward and arcuately around the disc 66, the radial portion being shown in this instance at 82 and the arcuate portion being of substantially uniform radium as shown at 83. The transmission line proceeds around the disc 66 coaxially of the assembly until it has circled approximately the full 360 degree arc of the disc, terminating at 84.

However, in the present instance, it is desired, by virtue of design considerations, to employ only a portion of the complete transmission line, and to that end the other terminal of the transmission line is constituted by a screw 86 which passes through the insulating disc 66 and into the terminal boss 71. The electrical engagement between the head of the screw 86 and the transmission line 83 carries current from the line into the boss 71 and thence to the ring 69 to which is electrically and physically bonded a terminal wire 88 (FIGS. 3 and 13) leading to the center conductor 89 of a coaxial transmission line having an outer shell or conductor 91 projecting from the end cap 73.

The ring 76 is held in place by a rim of phenolic resin 78 set in place in a groove 80 formed around the inside of the wall 74.

The ring 69 forms a ground plate or plane on one side of the transmission line 83. The electrical capacitance inherent in the dielectric members 66 and 68 forms a distributed capacitance along the transmission line 83.

It is desirable that the width of the arcuate gap 81 be sufficient to minimize cross coupling between the conductive portions 83 and 67. Thus, while the spacing between 83 and 67 represented by the width of the arc gap 81 may be less than the spacing parallel to the axis between the strip 83 and the ground plate 89, the distributed capacitance nonetheless is much greater between the latter members because the dielectric constant of the members 66 and 68 is considerably greater than that of air and furthermore the effective facing area of the members is much greater parallel to the axis than radially across the gap 81.

These same considerations apply to the distributed capacitance between the line 83 and the inner ring 76, which constitutes a second ground plate or plane on the other side of the line 83.

While both of the planes 76 and 69 constitute ground planes as far as RF is concerned, only the plane 76 is D.C. grounded, being in physical and electrical contact with the cylindrical flange 76 of the end cap 73. The plane 69 is connected to a source of anode voltage (B plus) through a filter to be described hereinafter, but is nonetheless at RF ground through coupling capacitors.

At the other end of the tube the annular coaxial components are nested sandwich-like against a shoulder 101 formed within the cylindrical cavity 32. Against the shoulder 101 is applied a resilient fingered conducting ring 102, then an insulating ring 103, then the conducting ring 56 to which the ring terminal 54 is bonded.

A conducting ring 104 has a cylindrical flange 106 which extends over to the ring 56 forming an annular chamber within which are successively sandwiched an insulating ring 107 and another insulating ring 108 having a conductive coating 109 shown for clarity in greatly exaggerated thickness. A portion of the conducting coating 109 is removed (or unprinted) as shown at 111 to form an arcuate transmission line 112. Next comes an insulating ring 113. The internal diameter of the several rings described immediately above varies in stepped fashion to accommodate the various shoulders of the stepped conducting ring 52 carrying the spring terminal finger 51.

Next comes an insulating ring 114 which extends radially inward to completely cover the ring 52, and finally another insulating ring 116 which lies contiguous to the inner surface of the conducting ring 104.

The sandwich assembly is completed by an insulating ring 121, a conducting ring 122, an insulating ring 123 and the aforementioned ring 48 having the internal cylindrical flange 50 connected to the cathode of the valve 33. A pair of insulating discs 126 and 41 overlie the ring 48 and are held in place by the nut 43 as described hereinbefore.

The entire sandwich assembly is insulated from the cylindrical housing, representing ground, by a cylindrical sleeve 130.

The control grid terminal ring 52 bears physically and electrically against the central portion 109 constituting the inner terminal of the transmission line 112. The arcuate line 112 is connected to the center portion 109 by a short radial portion 127 and thence proceeds arcuately almost 360 degrees around the face of its insulating base 108, terminating at 128. Only a short portion of this line is used in the present design, the other terminal being taken off at a screw 129, threaded into a conducting bushing 131, pressed into the insulating ring 108 in electrical contact with the transmission line 112 (FIG. 6).

The screw or bolt 129 constitutes one terminal of the transmission line 112 and carries current out of the assembly to the ring 122. Into the ring 122 diametrically opposite from the screw 129 is threaded a terminal 134 (FIG. 9). Where the screw 129 passes through the conducting ring 104 it is insulated by a sleeve or grommet 132 and where the terminal 134 passes through the ring 48 it is insulated by a sleeve or grommet 133.

Figures 4, 5, 6, 7, 8, 9, 10:
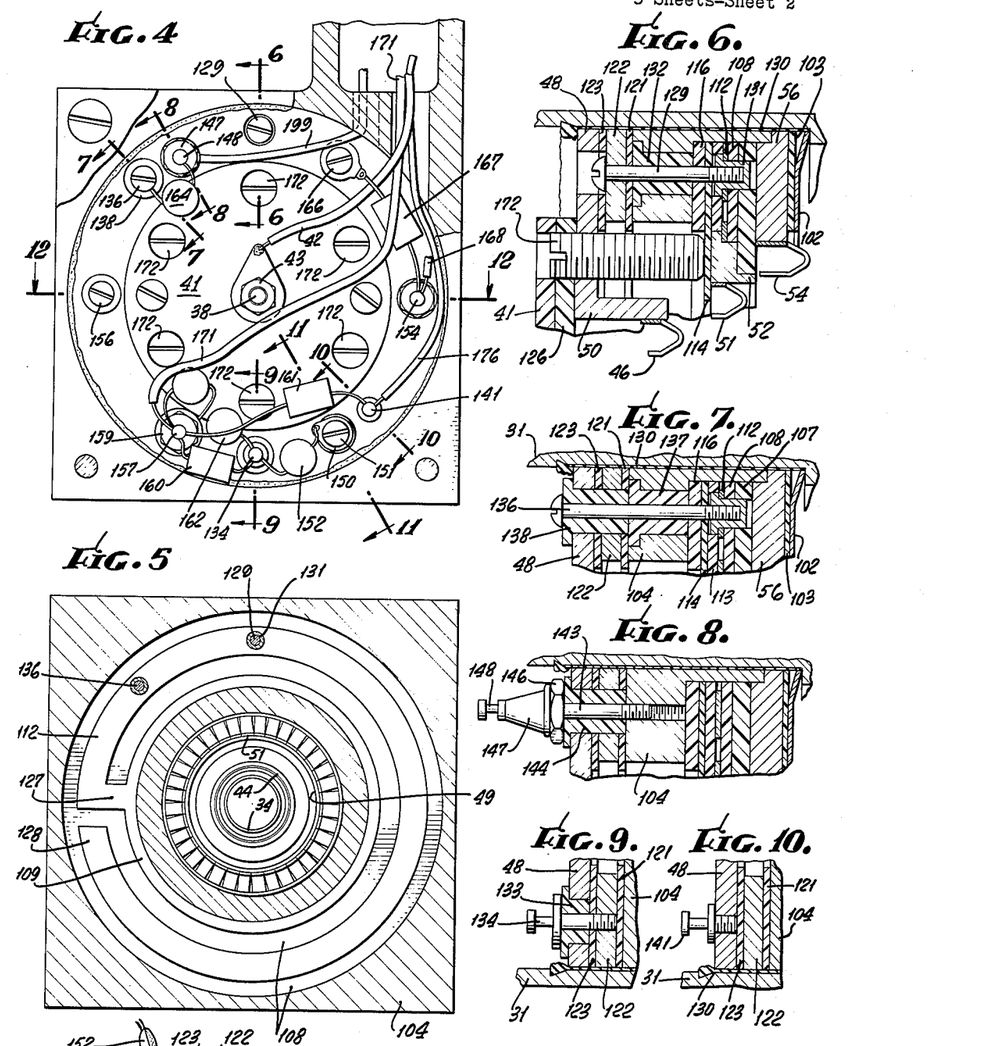
FIGS. 4 and 5 are cross-sections taken on lines 4—4 and 5—5 respectively, in FIG. 3.
FIGS. 6, 7, 8, 9, 10, 11 and 12 are fragmentary sections taken on the correspondingly numbered section lines in FIG. 4.

Intermediate the terminals 109 and 129 (FIG. 5) of the transmission line 112, the line is tapped by a terminal screw 136 (FIG. 7) which makes contact with the line 112 in a manner similar to that of the terminal screw 129 shown in FIG. 6. As shown in FIG. 7, the terminal screw 136 is brought out without contacting any of the overlapping conducting rings, being insulated therefrom by grommets 137 and 138.

Contact to the outer ring 48 constituting the cathode terminal of the sandwich assembly is made by a terminal post 141 threaded thereinto as shown in FIG. 10.

Contact to the ring 104 is effected by a terminal bolt 143 (FIG. 8) passing through an insulating grommet 144. The bolt 143 terminates in a hexagonal head 146 surmounted by an insulator 147 capped by a terminal 148. The terminal 148 provides simply a convenient mounting point to which the terminals of other components may be secured.

Figure 11:
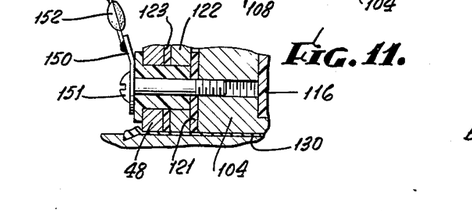

In FIG. 11 there is shown one of six bolts or screws threaded into the ring 104 which serve to clamp the assembly together, consisting of the layers 104, 121, 122, 123 and 48. Three of these screws terminate in insulating heads 147 as shown in FIG. 8, while the remaining screws are simply kerf headed screws as shown at 151 in FIG. 11. Certain of these screws are employed to give electrical access to the ring 104, while their heads 147 provide dummy terminals as shown at 148 in FIG. 8.

A lug 150 held by the screw 151 (FIG. 11) against ring 48 gives electrical access for the connection of a capacitor 152 (FIG. 4). The other side of the capacitor 152 is connected to the post 134 (FIG. 9) threaded into the ring 122.

Figure 12:
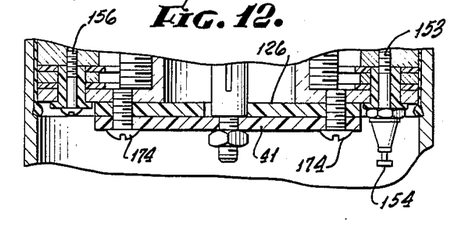

At the right hand side of FIG. 12 there is shown another screw 153 substantially identical to 148 as shown in FIG. 8, and surmounted by an isolated dummy terminal 154. At the left of FIG. 12 is another screw 156 threaded into the ring 104 in substantially the same manner as 151 shown in FIG. 11.

At 157 in FIG. 4 is illustrated a dummy terminal substantially identical to the terminal 148 shown in FIG. 8. This terminal serves as a connecting post for one side of a capacitor 158, the other side of which is electrically connected to the hexagonal head 159 of the screw which is threaded into the ring 104. (Note FIG. 8 for details.) Between the dummy terminal 157 and the transmission line terminal 134, is connected a resistor 160.

Between the terminal 157 and the terminal 141 connected to the valve cathode is connected a resistor 161. Also between the terminal 134 and terminal 159 threaded into the ring 104 is connected a capacitor 162.

Between the terminal 136 tapped into the transmission line as shown in FIG. 7, and the dummy terminal 148 is connected a coupling capacitor 164.

Electrically connected to a screw 166, which is substantially the same as the screw 151 shown in FIG. 11, is a resistor 167, the other side of which is connected to the dummy terminal 154. From the terminal 154 a lead 168 connects to B-plus through a suitable filter.

From the terminal 157 runs a lead 171 which is connected to ground, i.e., the metal cylindrical housing 31 of the amplifier which also constitutes the B-minus terminal.

Tapped through the plate 48 which is connected to the cathode, are six screws 172 (FIG. 6) which project through the assembly into a capacitive relation with ring 52 connected to the grid. The dielectric (mica) insulating ring 114 prevents the screws 172 from being screwed in so far that they touch the ring 52. Thus, the space between the respective ends of the screws 172 and the ring 52, including the dielectric 114, constitutes a capacitive link between cathode and grid. By turning the screws 172 in and out, this capacity may be adjusted.

Referring to FIG. 12, there are shown a pair of mounting screws 174 passing through the phenolic disc 41 and the teflon disc 126.

As shown in FIG. 6, the capacitive adjusting screws 172 are threaded not only into the ring 48 but also into and through the phenolic disc 41 and the teflon disc 126. The holes in the teflon 126 are slightly undersize and thereby serve to lock the screws 172 against accidental turning through vibration. The phenolic 41 provides the necessary strength.

To the dummy terminal 141 (FIGS. 4 and 10) is connected a wire 176 which goes to one side of the heater source.

The anode circuit is tuned by means of a large screw 178 threaded through the wall 73 and into capacitive relation with the conducting surface 67 constituting the inner terminal of the spiral line 83. A portion of this capacitance is constituted by the teflon dielectric disc 66 while the adjustable portion is comprised of an air gap between the end of the screw 178 and disc 67. The teflon disc 66 also constitutes the base on which the spiral line 83 is printed. The adjusting screw 178 is locked in place by a lock nut 179.

Resistor 160 forms a grid-leak bias, and resistor 161 a cathode bias. The principal purpose of resistor 161 is to protect the tube by biasing it against burn-out in case there is no signal to draw grid current.

Between the actual, internal anode of the tube or valve and the connecting link represented by the connecting spring fingers 62 (FIG. 13), the metal body 57 constitutes a coaxial transmission line, taken in conjunction with the cavity 32 representing a ground plate for the line. This coaxial line or connection serves as a medium from which output is taken from the amplifier by means of an arcuate coupling probe 181 (FIG. 15) insulated by sheath 182. One end of the arcuate probe 181 is connected to a terminal 183 leading outwardly of the housing. The probe 181 is made flexible and is adjustable toward and away from the body 57, i.e., the transmission line, by means of an adjusting screw 184 threaded through the housing 31.

Figure 16:
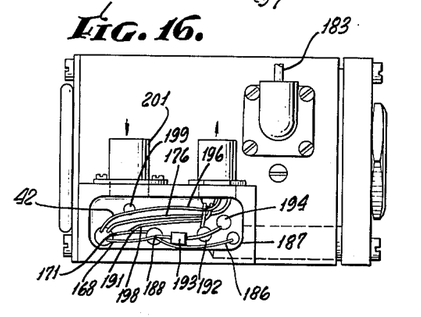
FIG. 16 is a top view of the amplifier drawn to the same scale as FIGS. 1 and 2.

The connector 89 is connected electrically to a wire 186, which goes into a connection box 187 (FIG. 16) and thence to a dummy or stand-off terminal 188. The wire 168 leading from the resistor 167 (FIG. 4) is also connected to the dummy terminal 188. The B-minus wire 171 (FIG. 4) also enters into the junction box 187 and is connected to a ground lug 191, secured under the dummy terminal 188, but not electrically connected thereto. The ground lug 191 is connected electrically to the conducting housing.

Connected between the dummy terminal 188 and another dummy terminal 192 is an inductance 193 constituting the inductive portion of the plate supply filter. Connected between the terminal 192 and ground is a capacitor 194 which constitutes a portion of the plate supply filter and in this connection supplements the action of the capacitor 72 previously discussed. The lead 196 goes outside of the housing 187 to a source of plate supply.

The heater connecting wires 42 and 176 also feed through the connecting box 187 and out to a suitable source of heating voltage. A wire 198 connected to the ground lug 191 also feeds through the outlet port and constitutes an external ground connection.

Leading from the input stand-off terminal 148 (FIG. 4) is a connecting wire 199 that also enters through another opening into the connecting box 187 and thence through an input port or connection 201.

It will be noted in FIG. 5 that the transmission line forming an important feature of the present invention consists of a principal, arcuate portion 112, into which a screw 129 is tapped to form an outer terminal, and a central portion 109 constituting the inner terminal. The two portions are connected by a strip 127 that extends radially outward and forms an electrical link between the two.

Figure 17:
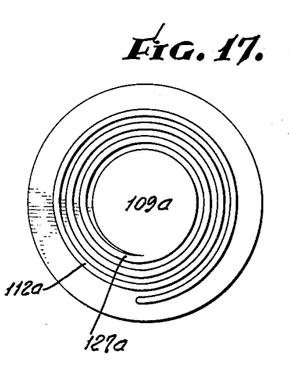
FIG. 17 is a plan view of a transmission line member showing an alternative form of construction.
Figure 18:
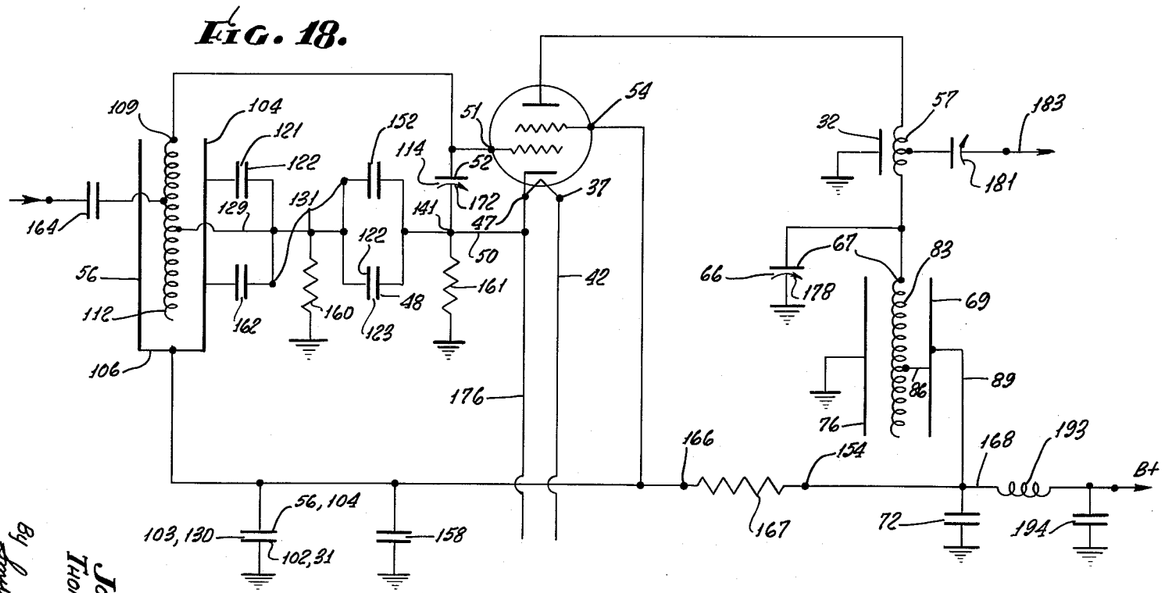
FIG. 18 is a schematic diagram corresponding to the physical combination shown in FIG. 3.

In FIG. 17, an alternative form of arcuate line is shown which is in the shape of a spiral. In this case, the arcuate portion 112a is in the shape of a classic spiral and thus increases progressively in radius as the arc proceeds around the circle, whereby a number of turns may be placed on the same dielectric disc if desired. Thus the connecting link constitutes simply the inner portion 127a of the arcuate conductor and joins directly with the central inner terminal 109a of the line.

Figures 19, 20, 21:
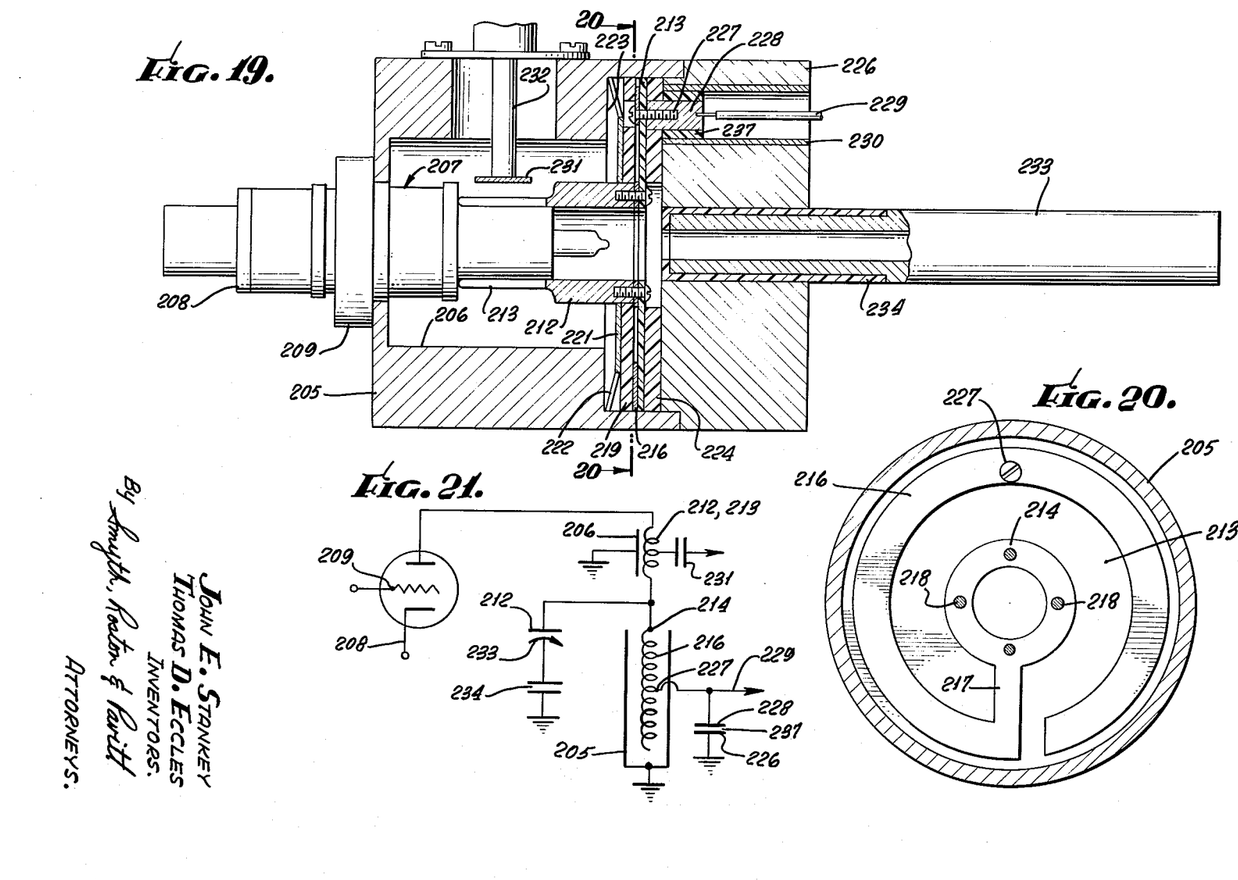
FIG. 19 is a longitudinal section illustrating another form of the present invention.
FIG. 20 is a cross-section taken on line 20—20 in FIG. 19.
FIG. 21 is a schematic diagram corresponding to the physical combination illustrated in FIG. 19.

In FIGS. 19 and 20, another form of structure for adapting the spiral or arcuate transmission line of the present invention to a coaxial assembly is illustrated. FIG. 21 is a schematic diagram of this assembly.

Referring to these figures, 205 represents a conducting body or housing having a cylindrical cavity 206. Projecting axially into the cavity 206 is an electronic view 207 having substantial polar symmetry and including a cathode terminal 208 and a grid terminal 209 located outside of the cavity 206, which are connected in any suitable manner to appropriate circuits not shown. The anode or plate terminal 211 has engaged thereover a cylindrical terminal 212 slit as shown at 213 to provide a plurality of resilient fingers. The cylinder 212 in conjunction with the cavity wall 206 constitutes a coaxial transmission line forming a part of the plate tank circuit.

This line is electrically continued by an arcuate sandwich type transmission line constructed in accordance with the present invention. This continuation transmission line consists of a thin conducting layer of metal formed on dielectric ring 213 and having a central ring portion 214 constituting the inner terminal of the transmission line, an arcuate portion 216 forming the greater portion of the transmission line, and a radial connecting portion 217 which provides communication between the inner terminal portion 214 and the arcuate portion 216.

The ring 214 bears against the right hand edge of the cylinder 212 and is held in firm electrical engagement therewith by four screws 218 which also pass through the dielectric disc or ring 213. To the left of the arcuate transmission line 216 is disposed another dielectric ring or disc 219, and a ring 221 having inclined fingers 222 bearing against a shoulder 223 formed interiorily in the body 205 and constituting an enlargement of the cavity 206. To the right of the disc 213 is another dielectric disc 224. The entire assembly is capped by a thick metal cover 226 fitted into and against the body 205 and completely closing the cavity 206.

A screw 227 passes through the arcuate strip 216 and into a plug 228 to which is connected the central conductor 229 of a coaxial output line 230. The screw 227 thus constitutes the outer terminal of the arcuate transmission line in this particular embodiment. The disc 221 and plug or cap 226 constitutes ground plates on either side of the arcuate line 216 and thus form a portion of the transmission line which continues the coaxial or cylindrical transmission line 212.

Coupling to the plate circuit is achieved through an arcuate probe 231 to which is connected an insulated output conductor 232 passing through the walls of the body 205.

Plate tuning is achieved by an axially movable probe 233 having an insulating sheath 234. The probe may be externally actuated to slide in and out an adjustable distance inside the cylindrical line portion 212, thereby providing variable capacity coupling between the plate line and ground at the point where the coaxial portion of the plate line joins the sandwich or arcuate portion.

A by-pass capacitor tying the end of the arcuate transmission line 216 to ground is provided by a dielectric cylindrical sleeve 237 intermediate the lug 228 and the outer conductor 230 of the output transmission line.

The arcuate transmission line of the present invention is ideally suited for use in making various types of filters, as the resulting structures are discs of a sandwich-like nature, readily adapted for module fabrication and stacking one upon another.

A low-pass filter, constant K, is illustrated in FIGS. 22, 22a, 22b, and 22c. In these figures, 22 is a cross-section, 22a is an equivalent schematic diagram, 22b is an end or plan view and 22c is an exploded perspective view.

Figure 22:
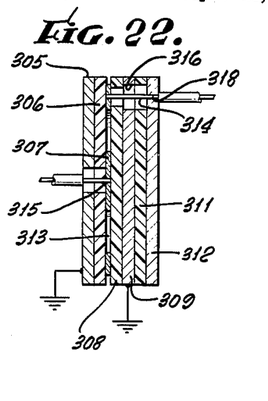
FIG. 22 is a cross-sectional view of a filter sandwich constituting a low-pass constant K filter.

In this form of filter a sandwich is created consisting of a circular conducting plate 305 constituting a ground line or plane for the transmission line. Next to the plate 305 is dielectric disc 306, and then an arcuate transmission line 307, which, in a preferred form of the invention, consists of a thin layer of metal formed as by printing on a dielectric disc 308. This is followed by another conducting ground plate 309 to complete the transmission line proper. The filter assembly is then continued by the provision of another dielectric disc 311, and a conducting plate 312, which, together with the plate 309 and the dielectric 311, constitutes the capacitor of the filter.

The entire sandwich is held together by any suitable means, not shown, in the relationship illustrated in FIG. 22.

Figures 22A, 22C:
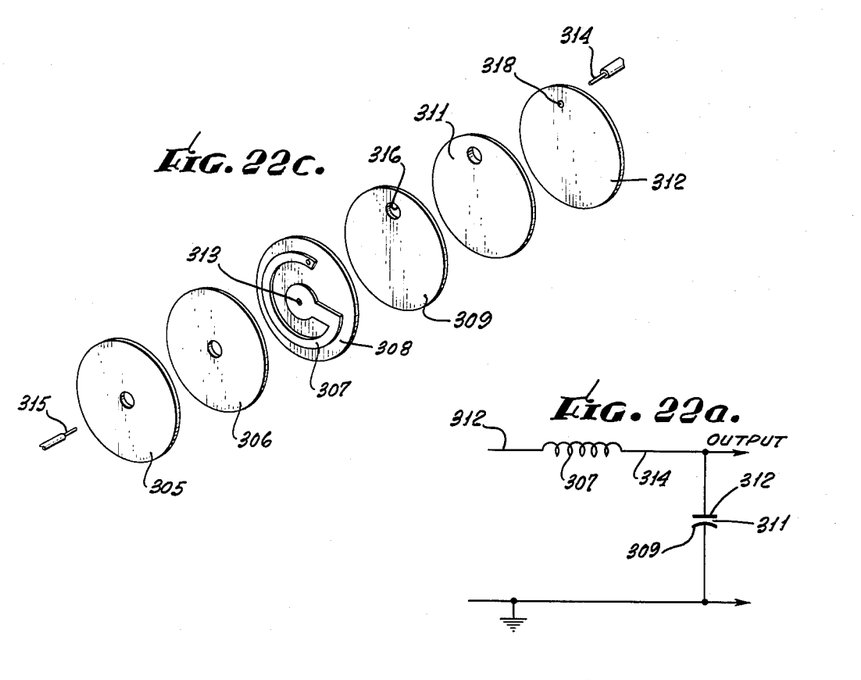
FIG. 22a is a schematic diagram corresponding to the physical elements of this filter.
FIG. 22c is an exploded perspective view.
Figure 22B:
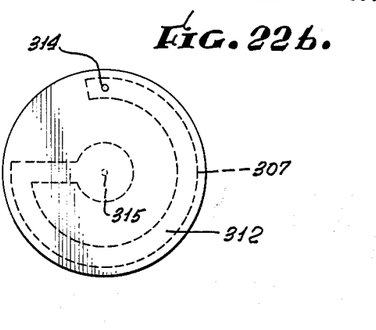
FIG. 22b is a plan view.

Aligned axial holes in the discs 305 and 306 provide passage for an insulated input lead 315, which is connected electrically and physically to the center portion 313 of the transmission line. At a suitable position around the arc 307, depending upon the length of the line desired for the design, is connected an output lead 314. In FIG. 22c, this position is shown as being the end of the arc 307, which, however, has not been continued for the full 360 degree circle. A hole 316 in the ground plate 309 permits the wire 314 to pass through the plate 309 without contact therewith and thence into electrical and physical engagement with the end of the line 307, where the wire 314 passes through the conducting plate 312. At 318 it is soldered thereto to provide an electrical connection for the capacitive field to be formed in the dielectric 311.

The ground plates 305 and 309 are suitably grounded as shown schematically.

Figure 23:
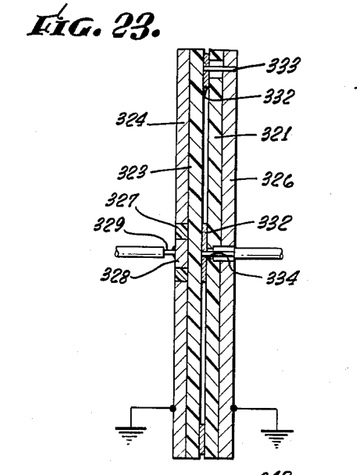
FIG. 23 is a cross-section of a high-pass filter, constant K.
Figure 23A:
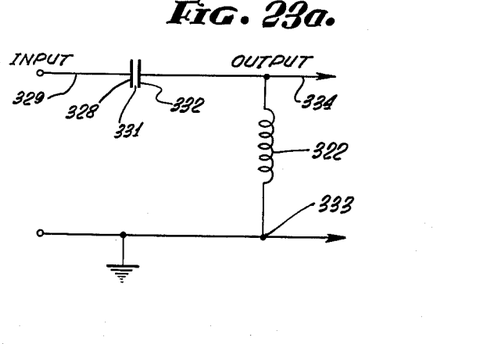
FIG. 23a is a schematic diagram thereof.

A high-pass filter, constant K, is shown in FIGS. 23 and 23a. As shown in FIG. 23, a dielectric disc 321 has provided on its surface an arcuate conductor 322 having a configuration generally similar to that of the conductor 307 shown in FIG. 22c. Adjacent the conductor 322 is another dielectric disc 323 followed by a conducting ground plate 324. On the opposite side of the dielectric disc 321 is another conducting ground plate 326. The ground plates 324 and 326 are suitably connected to ground as shown schematically.

In a hole in the center of the ground plate 324, and insulated therefrom by an annular dielectric ring 327, is a small disc or capacitor plate 328 to which is electrically and physically connected the input lead 329. Capacitive coupling through the center portion 331 of the dielectric disc 323 between the inner portion 332 of the transmission line 322 and the small central disc 328 constitutes the capacitor of the filter as shown in FIG. 23a.

The outer end of the transmission line 322 is connected to the ground plate 326 by a conductor passing through the dielectric 321 as shown at 333.

The output connector is soldered directly to the center portion 332 of the transmission line 322 as shown at 334 and taken out without contact through an axial hole in the ground plane 326.

Figures 24, 24A:
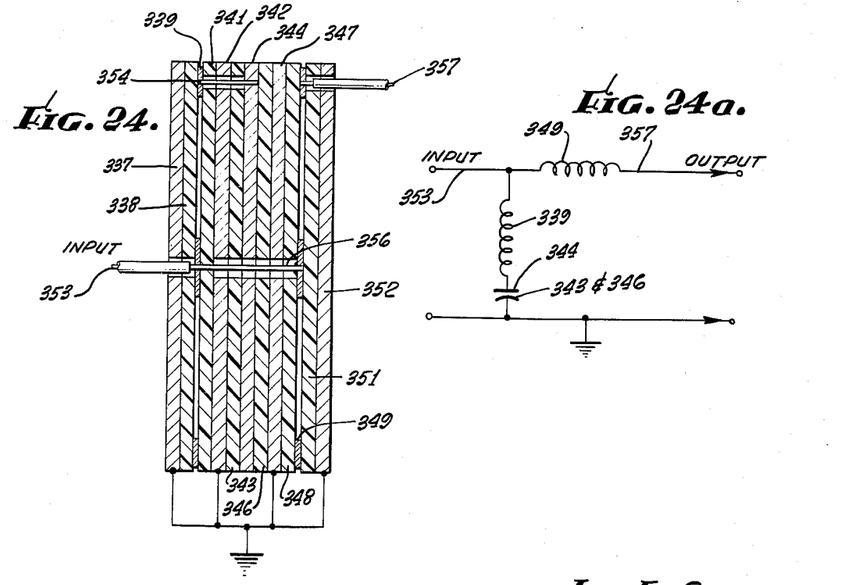
FIG. 24 is a cross-sectional view of a low-pass filter, M-derived.
FIG. 24a is a schematic diagram thereof.

In FIG. 24, there is illustrated a low-pass filter, M-derived, having alternate conducting and non-conducting sandwich layers as follows: ground plate 337, dielectric 338, arcuate line 339 printed or formed on its dielectric base 341, ground plate 342, capacitor dielectric 343, capacitor plate 344, dielectric 346, ground plate 347, dielectric base 348, on which another arcuate line 349 is printed or otherwise mounted; dielectric plate 351, and ground plate 352.

The input lead 353 passes without contact through ground plate 337 and is soldered to the center portion of the line 339. At a suitable point around the arc of the line 339 an interconnecting conductor 354 passes without contact through a hole in the ground plate 342 and over to the capacitor plate 344.

An inter-connecting axial lead 356 connects the center portion of the transmission line 339 with the center portion of the transmission line 349 without contacting the intermediate conducting plates. The output lead 357 is soldered at an appropriate point on the arc of the transmission line 349 and passes outwardly without contact through the ground plate 352.

The general correspondence of elements between FIGS. 24 and 24a is illustrated by use of the same numerals.

Figure 25:
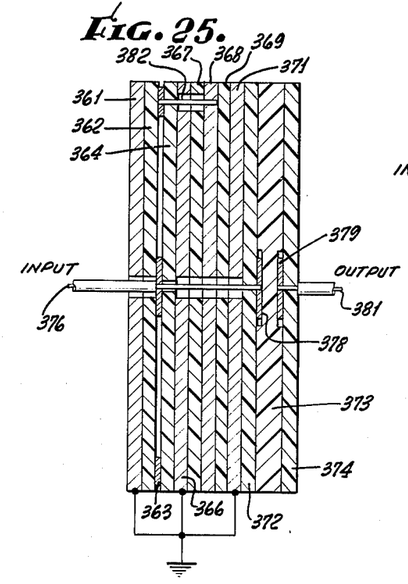
FIG. 25 is a cross-sectional view of a high-pass filter, M-derived.
Figure 25A:
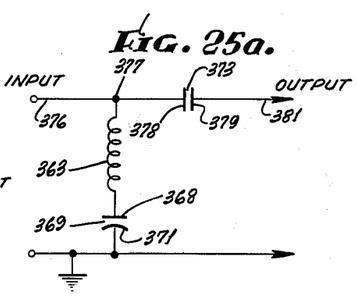
FIG. 25a is a schematic diagram thereof.

A high-pass filter, M-derived, is illustrated in FIGS. 25 and 25a, wherein the sandwich comprises the following layers: a ground plate 361, a dielectric disc 362, an arcuate transmission line 363 mounted on a dielectric disc 364; a ground plate 366, a dielectric plate 367, a capacitor plate or electrode 368, a capacitive dielectric disc 369, a ground plate 371; and a capacitive assembly consisting of an insulating disc 372, a capacitive dielectric 373 and an insulating covering disc 374.

Axially, through a hole in the left-hand ground plate 361 is brought an input lead 376, electrically connected to the center portion or terminal 377 of the transmission line 363, and passing axially to the right to terminate in a small central conducting capacitor plate 378. A complementary capacitor plate 379 completes an output capacitor from which an output lead 381 is taken.

At a suitable point on the arc of the line 363 a conductor 382 leads from the line through the ground plate 366 and thence to the capacitor plate 368.

Figure 26:
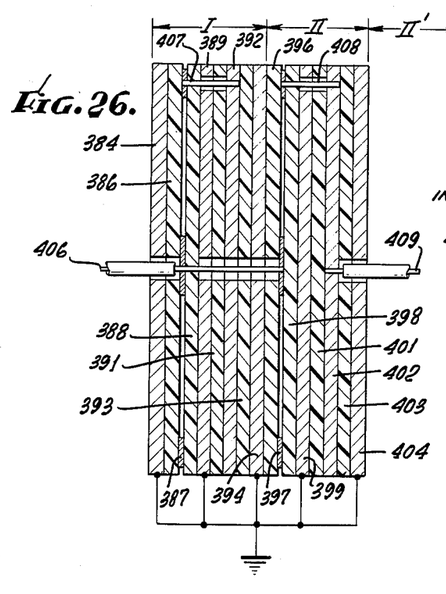
FIG. 26 is a cross-sectional view of a composite filter, low-pass, M-derived, followed by constant K.
Figure 26A:
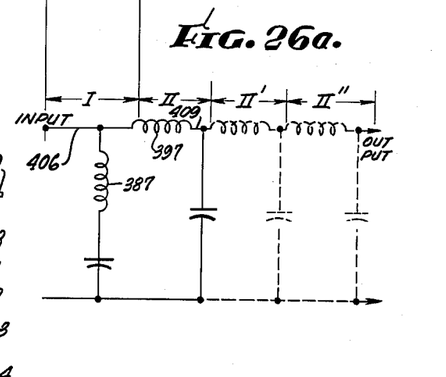
FIG. 26a is a schematic diagram thereof.

In FIGS. 26 and 26a are illustrated a composite low-pass filter, M-derived, followed by constant K.

Such a filter is shown and composed of the following layers: a ground plate 384, a dielectric plate 386, an arcuate transmission line 387 mounted on a dielectric plate 388 and followed by another ground plate 389; a capacitor dielectric plate 391, a conducting capacitor plate 392, a dielectric 393, and a ground plate 394.

Next to the ground plate 394 is a dielectric disc 396, followed by an arcuate transmission line 397, secured to a dielectric plate or base 398. This is followed by a conducting ground plate 399, a dielectric disc 401, a capacitor conducting plate 402, a dielectric disc 403 and finally an outer ground plate 404.

The input lead 406 passes through the ground plate 384 into electrical bond with the center terminal or portion of the arcuate line 387, and thence continues axially through the sandwich to the center terminal of the transmission line 397. At a suitable point on the arc of the transmission line 387, a conductor 407 forms a connection over to the capacitor plate 392. In similar manner, a conductor or lead 408 connects the arcuate line 397 and the capacitor plate 402. Output is taken axially from the capacitor plate 408 by an output lead 409.

As shown by the Roman numerals in FIGS. 26 and 26a, the left-hand portion of the sandwich up to and including a portion of the transmission line 387 constitutes a low-pass, M-derived filter. The remainder of the line 387 and the capacitor formed by the capacitor plate 402 constitutes a low-pass, constant K filter, this being the section marked with the Roman numeral II. To the right of the assembly illustrated in FIGS. 26, as many different sections as desired may be added as shown by the phantom lines in FIG. 26a. For example, to the right of ground plate 404 the assembly consisting of the elements 396, 397, etc. may be repeated as often as desired to add on as many constant K sections as is desired by the designer. In this case, the output lead 409 connects to the center portion or terminal of the next arcuate transmission line 397.

Figures 27, 27A, 28, 29, 30:
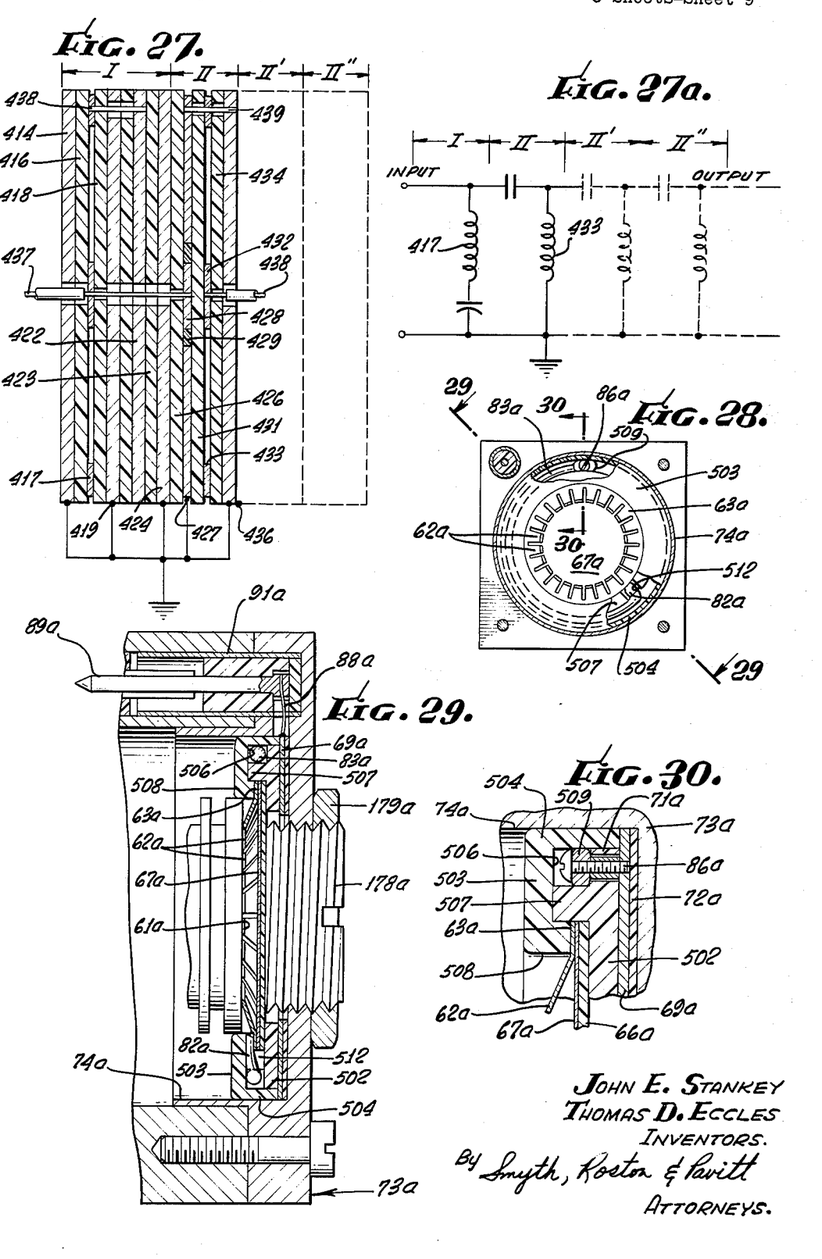
FIG. 27 is a cross-sectional view of a composite filter high-pass, M-derived, followed by constant K.
FIG. 27a is a schematic diagram thereof.
FIGS. 28, 29 and 30 illustrate an alternative form of arcuate conductor, FIG. 28 being a vertical cross-sectional view of the end cap similar to FIG. 13, showing the inner face of the cap, FIG. 29 being a cross-section taken on line 29—29 in FIG. 30, and corresponding somewhat to FIG. 3 and FIG. 30 being an enlarged fragmentary section taken on line 30—30 in FIG. 28.

In FIGS. 27 and 27a, there is illustrated a high-pass composite filter, M-derived, followed by constant K. This filter consists of: a ground plate 414, a dielectric disc 416, an arcuate transmission line 417 mounted on a dielectric disc 418, a ground plate 419, a capacitive dielectric 421 and a conducting capacitor plate 422. Next follows a capacitive dielectric 423, a ground plate 424, a dielectric disc 426, and a conducting ground plate 427, the center portion 428 of which is isolated from the annular outer portion 427 by an insulating ring 429. The center plate or portion 428 forms a capacitor plate cooperating with a dielectric disc 431 and the center terminal portion 432 of an arcuate transmission line 433 to form a coupling capacitor. The assembly is completed by a dielectric disc 434 and an outer ground plate 436.

The axial input 437 connects to the center terminal or portion of the transmission line 417 and thence proceeds axially through the assembly to connect to the center plate or disc 428, forming one plate of a capacitor as stated above. The output lead 438 is connected to the center terminal or disc portion of the transmission line 433.

As in embodiments previously disclosed, a conductor 438 is connected at a proper design point on the arcuate line 417 and connects over to the capacitor plate 422. In similar manner, a conductor 439 connects into the transmission line 433 and over to the ground plate 436.

As in the FIG. 26 embodiment, additional constant K sections may be added by duplicating the assembly starting with the elements 426, 428, 427, etc.

Referring to FIGS. 28, 29 and 30, there is shown an alternative form of arcuate conductor which is round in cross-section instead of being flat. In these figures, reference numerals, followed by the post-script a, denote identical or homologous parts of the apparatus corresponding to the form already shown, particular reference being had to FIGS. 3 and 14.

Referring particularly to FIG. 29, the arcuate conductor 83a of circular cross-section is shown as being housed in an annular chamber formed between a dielectric ring 502 abutting the conducting ring 69a, and a dielectric ring 503. The ring 503 has a peripheral cylindrical flange 504 fitted closely within the flange 74a which extends over to the conducting plate 69a, past and around the outer edge of the ring 502, thus forming the outer wall of a chamber 506. The ring 502 has an annular inwardly projecting cylindrical flange 507, which abuts the face of the ring 503 and thus closes the inner radius of the chamber 506.

The ring 503 projects radially inward past the flange or wall 507 and has a short inturned flange 508 which presses against the ring 63a, having the fingers 62a, thus physically enhancing the securement of rings 63a in place.

One end of the arcuate conductor 83a is flattened as shown at 509 (FIG. 28) and through this flattened portion is passed a screw 86a threaded into a boss 71a bonded to the ring 69a. In this way, electrical and physical contact is effected from the end of the conductor 83a over to the ring 69a.

The other end of the arcuate conductor is flattened and turned radially inward as shown at 82a, passing through a notch 512 formed in the flange 507. The inner end of this radial portion is bonded to the conducting plate or film 67a from which contact is made to the finger 62a.

The principles of this invention may be equally applied to amplifiers, multipliers, oscillators or other suitable electronic apparatus.

While the instant invention has been shown and described herein in which is conceived to be the most practical and preferred embodiments, it is recognized that departures may be made therefrom within the scope of the invention, which is therefore not to be limited to the details described herein, but is to be accorded the full scope of the claims.

What is claimed is:

1. In an electronic assembly,
   an electrically conductive housing having a cavity defined by an electrically conductive surface extending in a first direction and having a particular configuration and particular dimensions to define a ground plane,
   an electronic valve disposed inside of said housing and extending in the first direction in displaced relationship to said electrically conductive surface and said valve including a cathode and control electrode and an output electrode, said valve including first and second and third terminal means on the exterior of the valve in displaced relationship to each other, the first and second and third terminal means being electrically coupled respectively to the cathode and the control electrode and the output electrode of the valve,
   a first transmission line including at least a first conductive ground plane having the particular configuration and substantially the particular dimensions and having the particular dimensions of the first transmission line aligned and in contiguous relationship with the particular dimensions of the housing and including a first electrical conductor uniformly spaced from said ground plane and having an arcuate configuration in a second plane transverse to the first direction, the first transmission line being connected electrically to the second terminal means, and a second transmission line including at least a second conductive ground plane having the particular configuration and substantially the particular dimensions and having the particular dimensions of the second transmission line aligned and in contiguous relationship with the particular dimensions of the housing and including a second electrical conductor uniformly spaced from the second ground plane and having an arcuate configuration in the second plane, the second transmission line being connected electrically to the third terminal means.

2. In an electronic assembly, a housing having a cavity defined by an electrically conductive surface extending in a first direction and defined by particular dimensions and a particular configuration in a plane substantially perpendicular to the first direction, an electronic valve disposed inside of said housing in spaced relationship to the electrically conductive surface in the housing and extending in the first direction, an electrode disposed within the valve to control the operation of the valve, terminal means on the exterior of the valve and electrically communicating with the electrode in the valve, said terminal means having at least one electrically conductive surface positioned relative to said electrically conductive surface defining the cavity in the housing to form coaxial transmission means, and a transmission line including at least one conductive ground plane defined by substantially the particular dimensions and the particular configuration in the plane substantially perpendicular to the first direction and substantially aligned in the first direction with the housing, the transmission further including an electrical conductor uniformly spaced from said ground plane and having an arcuate configuration in a plane transverse to the first direction, said electrical conductor including a center portion that is electrically connected to said terminal means.

3. In an electronic assembly, a housing having a cavity defined by an electrically conductive cylindrical surface having an axis in a first direction, an electronic valve disposed inside of said housing in spaced and coaxial relationship with the cylindrical surface, said valve extending in the first direction and including at least one electrode, said valve including terminal means on the exterior of the valve, the terminal means being connected to the electrode and having at least one electrically conductive surface positioned substantially concentrically of said first surface to form coaxial transmission means, a transmission line including a pair of conductive ground plane disposed adjacent said electronic valve in a uniformly spaced relationship transverse to the axis of said cylindrical surface, the ground planes having an annular configuration with an axis corresponding to the axis defining the cylindrical surface of the housing, and an electrical conductor disposed between said ground planes in uniformly spaced relationship to said ground planes, said conductor being electrically connected to said terminal means and being provided with an arcuate configuration in the transverse plane to form an electrical continuation of said electrode in said valve.

4. In an electronic assembly, a housing having a cavity defined by an electrically conductive particular diameter and a cylindrical surface having a cylindrical axis in a first direction, an electronic valve disposed inside of said housing in the first direction in uniformly spaced relationship to the cylindrical surface in the housing, said valve including at least one electrode disposed within the valve, terminal means on the exterior of the valve, the terminal means enveloping the valve and having electrically conductive properties and connected electrically to the electrode in the valve, said terminal means being positioned substantially in spaced and coaxial relationship to the cylindrical surface in the housing to form coaxial transmission means with the cylindrical surface, a transmission line including at least one conductive ground plane and an electrical conductor disposed in planes substantially normal to the axis of said cylindrical surfaces, the conductive ground plane of the transmission line being provided with an annular configuration having an axis corresponding to the axis defining the cylindrical surface of the housing and being provided with substantially the particular diameter said electrical conductor having first and second opposite ends and being provided with an arcuate configuration and being substantially uniformly spaced from said ground plane and having the first end connected to the terminal means to form a continuation of the coaxial transmission means, and means connected electrically to the second end of the electrical conductor and extending from the housing to withdraw energy from the housing.

5. In an electronic assembly, a housing having a cavity defined by an electrically conductive cylindrical surface having a particular diameter and having an axis extending in a first direction, an electronic valve disposed inside of said housing and extending in the first direction in spaced and coaxial relationship to the electrically conductive cylindrical surface, at least one electrode disposed in the valve, terminal means positioned substantially concentrically relative to the electrically conductive cylindrical surface and connected electrically to the electrode to form coaxial transmission means with the cylindrical surface of the housing, a transmission line including a pair of conductive ground planes and an electrical conductor disposed in planes substantially normal to the first direction, said electrical conductor being disposed between said ground planes and being substantially uniformly spaced from said ground planes and having first and second opposite ends and including an arcuate portion that extends circumferentially along the periphery of the space between said ground planes to thereby form an electrical extension of said coaxial transmission means, the pair of conductive ground planes being provided with an annular configuration and with substantially the particular diameter and with axes corresponding to the axis of the housing, means connecting the terminal means electrically to the first end of the electrical conductor, and means connected electrically to the second end of the electrical conductor for obtaining a transfer of energy between the electrical conductor and a position external to the housing.

6. In an electronic assembly, a housing having a cavity defined by an electrically conductive cylindrical surface having a particular diameter and an axis extending in a first direction, an electronic valve disposed inside of said housing in spaced and coaxial relationship to the cylindrical surface in the first direction, at least one electrode disposed within the valve, terminal means on the exterior of the valve and electrically connected to the electrode in the valve, said terminal means being positioned in spaced coaxial relationship to said electrically conductive cylindrical surface to form coaxial transmission means with the cylindrical surface, a transmission line including a pair of conductive ground planes electrically connected to the cylindrical surface and further including an electrical conductor, the pair of conductive ground planes and the electrical conductor being disposed in plane substantially normal to the axis of said cylindrical surface, said electrical conductor being disposed between said ground planes and being substantially uniformly spaced from said ground planes, said electrical conductor having first and second opposite ends and including an arcuate portion that extends circumferentially along the periphery of the space between said ground planes, the pair of conductive ground planes having an annular configuration with substantially the particular diameter and having axes corresponding substantially to the axis of the housing, means electrically connecting the first end of the electrical conductor to the terminal means to thereby form an electrical continuation of said coaxial transmission means, and a probe disposed in said cavity and electrically coupled to the second end of the electrical conductor for coupling energy out of said cavity.

7. In an electronic assembly, a housing having a cavity defined by an electrically conductive cylindrical surface having a particular diameter and having an axis extending in a first direction, an electronic valve disposed inside of said housing in spaced and coaxial relationship to the cylindrical surface, at least one input electrode in the valve, at least one terminal on the exterior of the valve, the terminal having an electrically conductive surface positioned in spaced and coaxial relationship to said cylindrical surface to form a coaxial transmission means with the cylindrical surface, a pair of conductive ground planes disposed in planes substantially normal to the axis of said cylindrical surface and electrically connected to the cylindrical surface, the pair of conductive ground planes having a cylindrical configuration with the particular diameter and with axes corresponding substantially to the axis of the housing, an electrical conductor disposed between said ground planes and uniformly spaced from said ground planes and having first and second opposite ends and having an arcuate portion between said first and second opposite ends, said arcuate portion being positioned adjacent to the periphery of the space between said ground planes and extending circumferentially thereof to form a transmission line, and means electrically interconnected with said terminal and with said electrical conductor for coupling energy between said coaxial transmission means and said transmission line.

8. In an electronic assembly, including, a housing having an electrically conductive cylindrical passageway and having a particular diameter and further having a cylindrical axis extending in a first direction, electronic valve means disposed in said passageway in spaced and coaxial relationship with the passageway, a plurality of electrodes disposed in the valve means and including at least one input electrode and one output electrode, a plurality of terminal means on the exterior of said valve means, each of said terminal means having an electrically conductive surface positioned substantially coaxially of said passageway to form coaxial transmission means with said passageway, first and second terminal means in the plurality being respectively connected to the input and output electrodes in the valve means, a first transmission line including a first pair of conductive ground planes having an annular configuration with the particular diameter, the ground planes being disposed within said passageway and in planes substantially normal to the axis of said passageway and including a first electrical conductor disposed between the ground planes in the first pair and uniformly spaced from said ground planes in the first pair, means electrically connecting said first conductor to the second one of said terminal means in the plurality so that said first transmission line forms an electrical extension of said coaxial transmission means, the ground planes in the first pair being electrically connected to the passageway, and a second transmission line including a second pair of conductive ground planes having an annular configuration with the particular diameter, the ground planes in the second pair being disposed within said passageway in planes substantially normal to the axis of the passageway and in spaced relationship to the first transmission line in the first direction and including a second electrical conductor disposed between said ground planes in the second pair, the ground planes in the second pair being electrically connected to the passageway, the second electrical conductor being electrically interconnected to the first one of said terminal means in the plurality.

9. An electronic assembly, including, a housing having an electrically conductive cylindrical passageway having a particular axis and having a cylindrical axis extending in a first direction, electronic valve means disposed in said passageway in spaced and coaxial relationship to the passageway, a plurality of electrodes disposed within the valve means and including a first input electrode and a first output electrode, a plurality of terminal means on the exterior of said valve means and disposed in spaced and coaxial relationship to the passageway, at least a first one of said terminal means having an electrically conductive surface positioned substantially coaxially relative to said passageway to form coaxial transmission means with said passageway, the first one of the terminal means in the plurality being electrically connected to the first output electrode in the plurality, a second one of the terminal means in the plurality being electrically connected to the first input electrode in the plurality, a first transmission line removably disposed in said passageway and including a first pair of conductive ground planes and further including a first center conductor disposed between said ground planes in uniformly spaced relationship to the ground planes, said ground planes in the first pair having an annular periphery corresponding substantially to that of said passageway to provide a snug fit within said passageway and electrical continuity with said passageway, said ground planes in the first pair being disposed in planes substantially normal to the axis of said passageway, said first center conductor including an arcuate portion positioned circumferentially adjacent the periphery of said ground planes and having first and second opposite ends, means interconnecting the first end of said first center conductor with the first terminal means in the plurality to form a continuation of said coaxial transmission means, means connected to the second end of said first center conductor to withdraw energy from the first center conductor to a position external to the housing, a second transmission line removably disposed in said passageway and including a second pair of conductive ground planes and further including a second center conductor disposed between the ground planes in the second pair, said ground planes in the second pair having an annular periphery corresponding substantially to the periphery of said passageway to provide a snug fit within said passageway and electrical continuity with said passageway, said ground planes in said second pair being disposed in planes substantially normal to the axis of said passageway, said second center conductor including an arcuate portion positioned circumferentially adjacent the periphery of the ground planes in the second pair, and means electrically interconnecting said second center conductor with the second terminal means in the plurality.

10. The electronic assembly set forth in claim 9 wherein the housing is provided with first and second annular end caps at first and second opposite ends in the first direction and wherein the first and second caps are removably attached respectively to the first and second opposite ends and wherein the first transmission line is slidable into the passage in the housing through the first end of the housing with the first cap removed from the first end of the housing and wherein the second transmission line is slidable into the passage in the housing through the second end of the housing with the second cap removed from the second end of the housing.

11. A transmission line assembly, including, coaxial transmission means extending along a first axis and having a center conductor and a first ground plane enveloping the center conductor in spaced and coaxial relationship to the center conductor, the first ground plane having a circumference of particular dimensions, a plurality of layers of annular dielectric members and a plurality of annular conductive members having a circumference of the particular dimensions, a pair of said conductive members in the plurality being conductive ground planes positioned in planes substantially normal to the first axis and in electrically mating relationship with the first ground plane along the circumference of particular dimensions in the first ground plane, at least a first dielectric member in the plurality being disposed in the space between said pair of conductive ground planes, one of the conductive members in the plurality being an arcuate conductor disposed on said first dielectric member and being uniformly spaced from said pair of conductive ground planes, said arcuate conductor being disposed adjacent the periphery of said first ground plane to form an inductive reactance and to provide a capacitive reactance with said pair of ground planes, and terminal means interconnecting said arcuate member with the center conductor of said coaxial transmission means to form a continuation of said coaxial transmission means.

12. A transmission line assembly, including, coaxial transmission means extending along a first axis and having a center conductor and a first ground plane enveloping the center conductor in spaced and coaxial relationship to the center conductor, the first ground plane having an annular circumference of particular dimensions, a pair of annular conductive members positioned in planes substantially normal to the first axis and in electrically mating relationship with the first ground plane along the annular circumference of particular dimensions in the first ground plane, an arcuate conductor disposed between the annular ground planes in the pair and uniformly spaced from the ground planes in the normal plane to form an inductive reactance to provide a capacitive reactance with the pair of ground planes, and terminal means interconnecting the arcuate member with the center conductor of the coaxial transmission means to form a continuation of the coaxial transmission means.

13. The transmission line assembly set forth in claim 12 wherein dielectric members are disposed between the ground planes in the pair and the arcuate conductor.

References Cited by the Examiner

UNITED STATES PATENTS

| | | | |
|---|---|---|---|
| 2,550,485 | 4/1951 | Lavoo et al. | 330—56 |
| 2,751,558 | 6/1956 | Grieg et al. | |
| 2,755,344 | 7/1956 | Reinsma | 330—56 |
| 2,768,357 | 10/1956 | Lyons | 333—82 |
| 2,867,726 | 1/1959 | Priest | 330—56 X |
| 2,909,736 | 10/1959 | Sommers et al. | |
| 2,948,858 | 8/1960 | Stameson | 330—56 |

ROY LAKE, *Primary Examiner.*

NATHAN KAUFMAN, *Examiner.*